US012366826B2

(12) United States Patent
Mallet et al.

(10) Patent No.: US 12,366,826 B2
(45) Date of Patent: Jul. 22, 2025

(54) TIMEPIECE OSCILLATOR STRUCTURE WITH A DIVISIBLE ELEMENT

(71) Applicant: ETA SA Manufacture Horlogere Suisse, Grenchen (CH)

(72) Inventors: Daniel Mallet, Le Belieu (FR); Pierre Cusin, Villars-Burquin (CH); Raphael Courvoisier, Corcelles (CH); Pascal Winkler, St-Blaise (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 10 days.

(21) Appl. No.: 17/220,524

(22) Filed: Apr. 1, 2021

(65) Prior Publication Data

US 2021/0223741 A1 Jul. 22, 2021

Related U.S. Application Data

(62) Division of application No. 16/027,799, filed on Jul. 5, 2018, now Pat. No. 11,262,702.

(30) Foreign Application Priority Data

Jul. 7, 2017 (EP) .................................... 17180307

(51) Int. Cl.
*G04B 17/04* (2006.01)
*G04D 3/00* (2006.01)

(52) U.S. Cl.
CPC ......... *G04B 17/045* (2013.01); *G04D 3/0035* (2013.01)

(58) Field of Classification Search
CPC ..... G04B 17/045; G04B 17/04; G04D 3/0035
See application file for complete search history.

(56) References Cited

U.S. PATENT DOCUMENTS 10,732,572 B2 * 8/2020 Humair .................. G04B 31/06
2011/0103196 A1 5/2011 Buhler et al.

(Continued)

FOREIGN PATENT DOCUMENTS

CH 702 708 B1 8/2011
EP 2 104 005 A1 9/2009

(Continued)

OTHER PUBLICATIONS

European Search Report issued Mar. 1, 2018 in European Application 17180307.5, filed on Jul. 7, 2017 (with English Translation of Categories of cited documents & Written Opinion).

*Primary Examiner* — Renee S Luebke
*Assistant Examiner* — Matthew Daniel Hwang
(74) *Attorney, Agent, or Firm* — Oblon, McClelland, Maier & Neustadt, L.L.P.

(57) ABSTRACT

A timepiece oscillator structure includes at least one divisible unit, which includes at least one component which includes at least one flexible blade or at least one blade with necks, joining two main units, each more rigid than the flexible blade or blade with necks, where the divisible unit includes at least one protection unit adjacent to at least one main unit to which it is connected by at least one divisible linkage which is designed in order to make possible the detachment of this protection unit from the component when the component is fixed, with at least the particular main unit which is adjacent to the protection unit, to a more rigid external element than the flexible blade or than the necks of the blade with necks.

25 Claims, 5 Drawing Sheets

(56) References Cited

U.S. PATENT DOCUMENTS

| | | | | |
|---|---|---|---|---|
| 2015/0234354 | A1* | 8/2015 | Henein | G04B 17/045 368/170 |
| 2016/0124389 | A1* | 5/2016 | Lechot | G04B 31/04 368/322 |
| 2016/0179058 | A1* | 6/2016 | Born | G04C 3/008 368/167 |
| 2016/0223989 | A1* | 8/2016 | Winkler | G04B 17/28 |
| 2016/0274545 | A1* | 9/2016 | Humair | F16B 19/08 |
| 2016/0306324 | A1* | 10/2016 | Sarchi | G04B 17/066 |
| 2017/0010586 | A1* | 1/2017 | Di Domenico | G04B 17/045 |
| 2017/0038730 | A1* | 2/2017 | Winkler | G04B 17/20 |
| 2017/0123380 | A1* | 5/2017 | Winkler | G04B 17/066 |
| 2017/0220002 | A1* | 8/2017 | Helfer | G04B 15/14 |
| 2017/0227930 | A1* | 8/2017 | Di Domenico | G04B 17/045 |

FOREIGN PATENT DOCUMENTS

| | | | |
|---|---|---|---|
| EP | 3 037 893 | A1 | 6/2016 |
| WO | WO 2016/062889 | A2 | 4/2016 |

* cited by examiner

Fig. 3
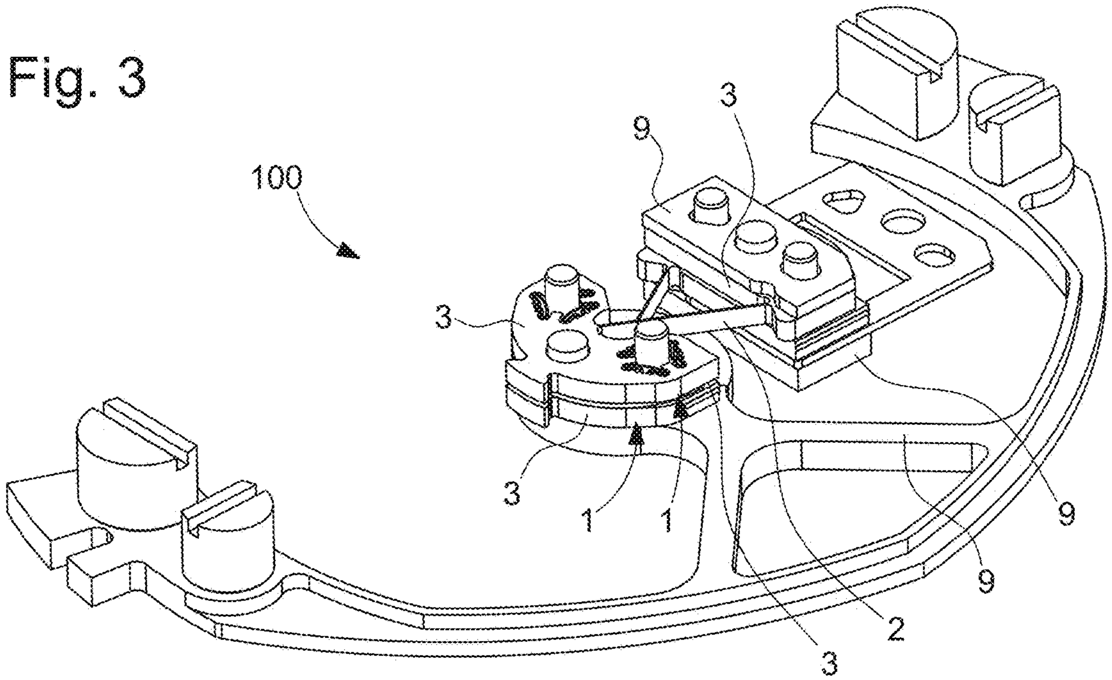
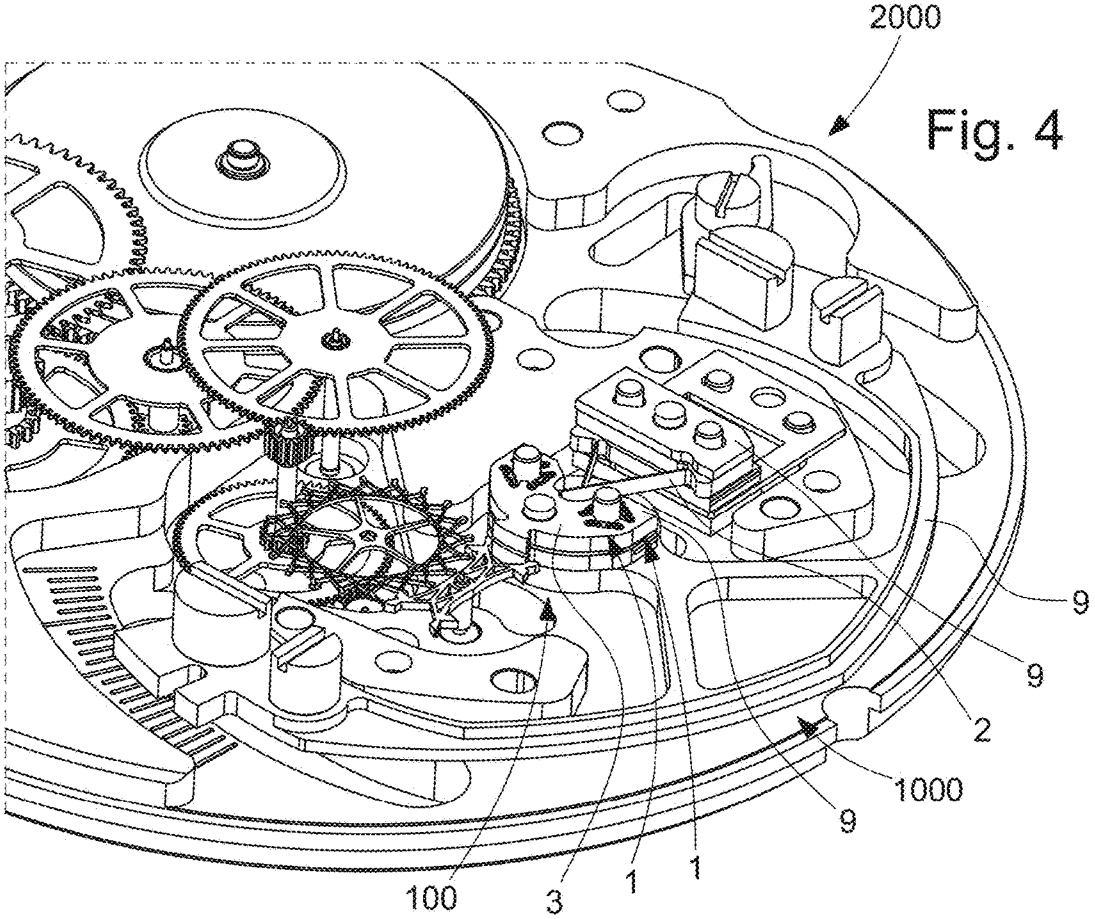
Fig. 4

TIMEPIECE OSCILLATOR STRUCTURE WITH A DIVISIBLE ELEMENT

This application is a divisional Application of U.S. application Ser. No. 16/027,799, filed on Jul. 5, 2018, which claims priority from European patent application No. 17180307.5 filed on Jul. 7, 2017, the entire disclosure of which is hereby incorporated herein by reference.

FIELD OF THE INVENTION

The invention relates to a timepiece oscillator structure comprising at least one divisible unit, which comprises at least one component which comprises at least one flexible blade or at least one blade with necks, joining two main units, each more rigid than said flexible blade or blade with necks, where said divisible unit comprises at least one protection unit which is designed to be adjacent to at least one said main unit to which it is connected by at least one divisible linkage which is designed in order to make possible the detachment of said protection unit from said component when said component is fixed, by means of at least said particular main unit which is designed to be adjacent to said protection unit, to a more rigid external element than said flexible blade or than the necks of said blade with necks.

The invention also relates to a timepiece oscillator mechanism comprising at least one such structure.

The invention also relates to a timepiece movement comprising at least one such timepiece oscillator mechanism.

The invention also relates to a watch comprising such a timepiece movement.

The invention also relates to a method for assembling a timepiece mechanism comprising at least one component, which comprises at least one flexible blade or blade with necks joining two units, each more rigid than this flexible blade or blade with necks.

The invention relates to timepiece oscillator mechanisms and manufacture thereof.

BACKGROUND OF THE INVENTION

The development of technologies for manufacturing timepiece components made of micromachinable materials, in particular made of silicon and silicon oxide, has made possible the production of elastic components with perfectly reproducible features, representing huge progress relative to the prior art comprising springs made of special steels. In particular, these technologies have made possible the design of oscillators with thin flexible blades, of very reduced dimensions and having very good chronometric properties.

However, handling such components is particularly delicate and any incorrect manoeuvre leads to destruction of components, the cost of which remains still high.

The application WO 2016/062889 A2 in the name of Richemont describes a regulating element for a mechanical clock movement comprising an escapement wheel and a vibrating oscillator provided with at least two vibrating arms and a pallets part which is connected to said vibrating arms and comprises elements arranged so as to cooperate directly with the teeth of the escapement wheel, so as to maintain periodic alternations of the vibrating oscillator and to make the escapement wheel move forward upon each alternation of the oscillations.

SUMMARY OF THE INVENTION

The invention proposes to industrialise the manufacture and assembly of components made of micromachinable materials, making possible handling with great safety and in particular by automated handling means.

To this end, the invention relates to a timepiece oscillator structure according to claim 1.

The invention also relates to a timepiece oscillator mechanism comprising at least one such structure.

The invention also relates to a timepiece movement comprising at least one such timepiece oscillator mechanism.

The invention also relates to a watch comprising such a timepiece movement.

The invention also relates to a method for assembling a timepiece mechanism comprising at least one component, which comprises at least one flexible blade or blade with necks joining two main units, each more rigid than this flexible blade or blade with necks.

BRIEF DESCRIPTION OF THE DRAWINGS

Other features and advantages of the invention will appear upon reading the detailed description which will follow, with reference to the annexed drawings, where:

FIG. 3 represents, in standard perspective, the oscillator structure of FIG. 2, at the same assembled and connected stage;

FIG. 4 represents, in perspective, the movement of a watch, comprising the oscillator structure of FIG. 3;

FIG. 6 comprises two units connected by an oblique flexible blade, a lateral protection unit, and a divisible linkage comprising a thinning of the section of the material, visible over a section which this Figure comprises;

FIG. 7 comprises two main units connected by an oblique flexible blade, a lateral protection unit, and a divisible linkage comprising an alternation of bridges and traversing openings, visible over a section which this Figure comprises;

FIG. 8 comprises two main units connected by an oblique flexible blade, a lateral protection unit, and a divisible linkage comprising an incipient fracture in the thickness of the material, visible over a section which this Figure comprises;

FIG. 9 comprises two main units connected by a blade with two necks, a protection unit in the shape of a U connected to the main units on both sides of the latter, and each main unit of which is connected by a simple bridge to the protection unit;

FIG. 10 comprises two main annular units connected by a straight flexible blade, a U-shaped protection unit connected to the units on both sides of the latter, and each main unit of which is connected by a simple bridge to the protection unit;

FIG. 11 comprises two levels, visible over a section which this Figure comprises, each comprising two main units connected by an oblique blade, a lateral protection unit, and each main unit of which is connected by a double bridge to the protection unit, and the two levels of which are designed such that the two flexible blade intersect, in projection on a plane parallel to that of the divisible unit;

FIG. 12 comprises two main units connected by an oblique blade, a U-shaped protection unit connected to the units on both sides of the latter, and each main unit of which is connected by a double bridge to the protection unit;

FIG. 13 comprises two main units connected by two oblique intersecting blades and comprising an eye in a central zone, a lateral protection unit, and each main unit of which is connected by a simple bridge to the protection unit;

FIG. 14 comprises two main units, one of which is an annular sector forming an inertial element, connected by two blades arranged in a V, a U-shaped protection unit connected to the units on both sides of the latter, and each main unit of which is connected by a simple bridge to the protection unit;

DETAILED DESCRIPTION OF PREFERRED EMBODIMENTS

Figure 1:
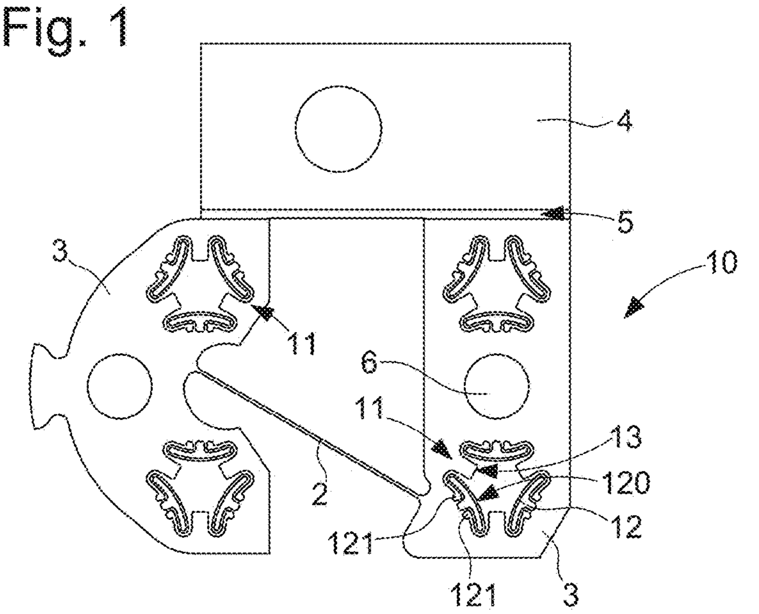
FIG. 1 represents, schematically, and in plan view, a divisible unit which a structure according to the invention comprises, in an initial rough manufacturing state and which comprises a component which, at this stage, is still connected to a sacrificial lateral protection unit via a divisible linkage.

The invention relates to a timepiece oscillator structure, comprising at least one divisible unit 10.

This divisible unit 10 is designed to protect, during manufacture, handling, assembly, the most fragile elements of at least one timepiece component 1.

The divisible unit 10 is designed to be separated, after its assembly with other elements, into one functional part formed by each component 1 which it comprises, and a sacrificial part which has no longer any use within the timepiece mechanism, in the centre of which the component 1 is incorporated. This sacrificial part is designed for easy handling, by an operator or by an automated handling means, and it forms a protection unit 4 which protects each component 1, and in particular the most fragile elements which the latter encloses, until separation of the protection unit 4 and components 1 by breaking by bending and/or twisting, cut with a tool such as a wire cutter or saw, or laser-cut, or other.

The divisible unit 10 is designed also, in a particular variant described further on, to allow pretensioning of a flexible element which the component 1 comprises, during manufacture of this divisible unit 10, and in order to preserve the pretensioning position during the entire assembly of the component 1, which makes any stress by a shaping tool or similar unnecessary.

In a preferred but non-limiting application of the invention, the fragile element to be protected is a flexible element, such as a blade or a spring, or similar.

More particularly, the divisible unit 10 comprises thus at least one component 1, which comprises at least one flexible blade 2 or at least one blade with necks 20.

This flexible blade 2 or blade with necks 20, joins two main units 3, each more rigid than the flexible blade 2 or the blade with necks 20 under consideration, at the level of embedding for the flexible blade 2, or at the level of necks 21 for the blade with necks 20.

According to the invention, the divisible unit 10 comprises at least one protection unit 4 which is adjacent to at least one such main unit 3, to which the protection unit 4 is connected by at least one divisible linkage 5. This divisible linkage 5 is designed in order to make possible the detachment of the protection unit 4 from the component 1 when this component 1 is fixed, by means of at least the particular main unit 3 which is adjacent to the protection unit 4, to an external element 9, which is more rigid than the flexible blade 2 or than the necks of the blade with necks 20.

The Figures illustrate, in a non-limiting manner, straight flexible blades 2, blades with necks 20 with a neck 21 on both sides, or even a flexible blade 2 comprising an eye 25 in its central part, it is understood that the shapes of these fragile elements can be extremely varied.

In particular, the component 1 is a timepiece oscillator component, and the flexible blade 2, or the blade with necks 20, is a main component of the oscillator, and ensures the chronometric properties thereof.

Figure 8:
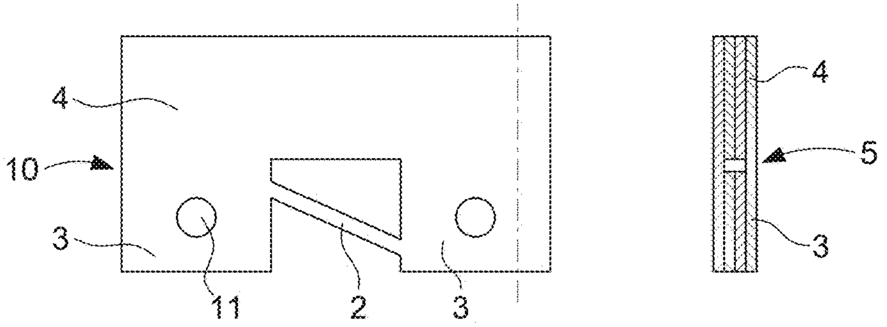
Figure 9:
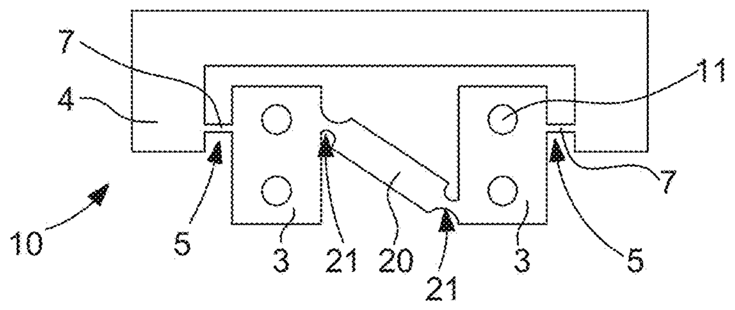
Figure 10:
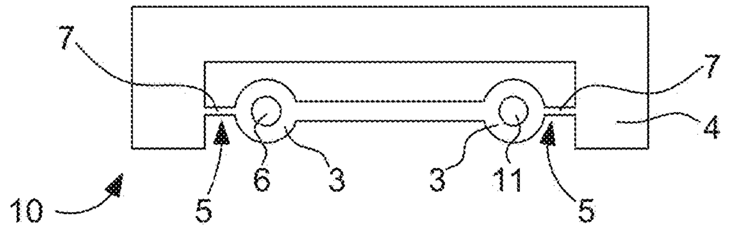

The divisible linkage 5 can be produced in various ways. In FIGS. 1, 2, 5, 6, this divisible linkage 5 comprises a zone of a smaller section than that of the main unit 3 and than that of the protection unit 4 which are adjacent thereto, in the manner of a cake of chocolate, or profile 2D, the divisible linkage 5 is easy to break by bending. In FIGS. 7 and 9 to 14, the divisible linkage 5 comprises at least one bridge 7 or a plurality of bridges 7, which can in fact be separated by traversing openings 8, such as holes or piercings, as is visible in FIG. 7, or even separate thin bridges as in FIGS. 9 to 14. The divisible linkage 5 can again comprise at least one incipient break produced in the thickness of the material, as visible in FIG. 8, and is suitable in particular in the case of manufacture by a multilayer process of the divisible unit 10, during which chambers are provided in the thickness of the material. Of course, the divisible linkage 5 can be produced by mixing these various manufacturing modes and can comprise a zone of a smaller section than that of the main unit 3 and of the protection unit 4 which are adjacent thereto, and/or comprise one or more bridges 7 which are separated or not by traversing openings 8, and/or comprise at least one incipient break produced in the thickness of the material. Advantageously during usage of bridges 7, the latter are designed to be broken very easily by twisting and/or bending and/or by cutting out.

In a particularly advantageous configuration, and as visible in the Figures, the same protection unit 4 is adjacent to the main units 3 situated on both sides of the same flexible blade 2 or blade with necks 20, in order to protect this flexible blade 2 or blade with necks 20.

More particularly, each main unit 3 is adjacent to a protection unit 4 to which it is connected by a divisible linkage 5.

Figure 14:
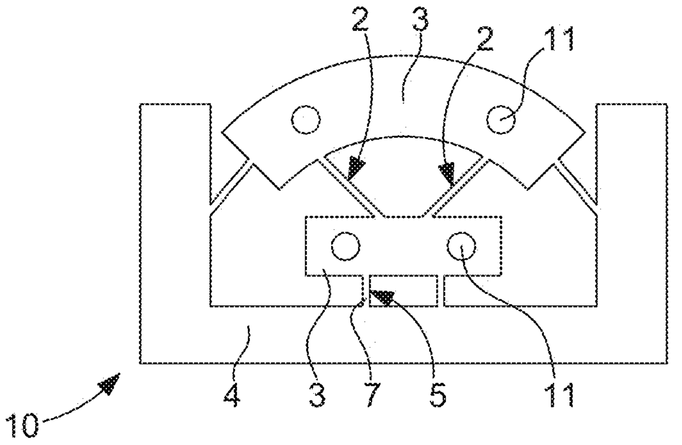
Figure 15:
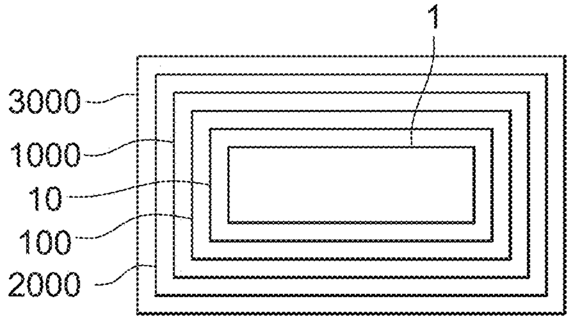
FIG. 15 is a unit diagram representing a watch comprising a movement comprising an oscillator mechanism which comprises such a structure.

In a particular configuration, at least one said main unit 3 forms a free inertial mass, and is designed to be fixed to another free inertial mass of another divisible unit 10, or to an external element 9; this is for example the case of FIG. 14, the annular sector of which is such an inertial mass.

Figure 2:
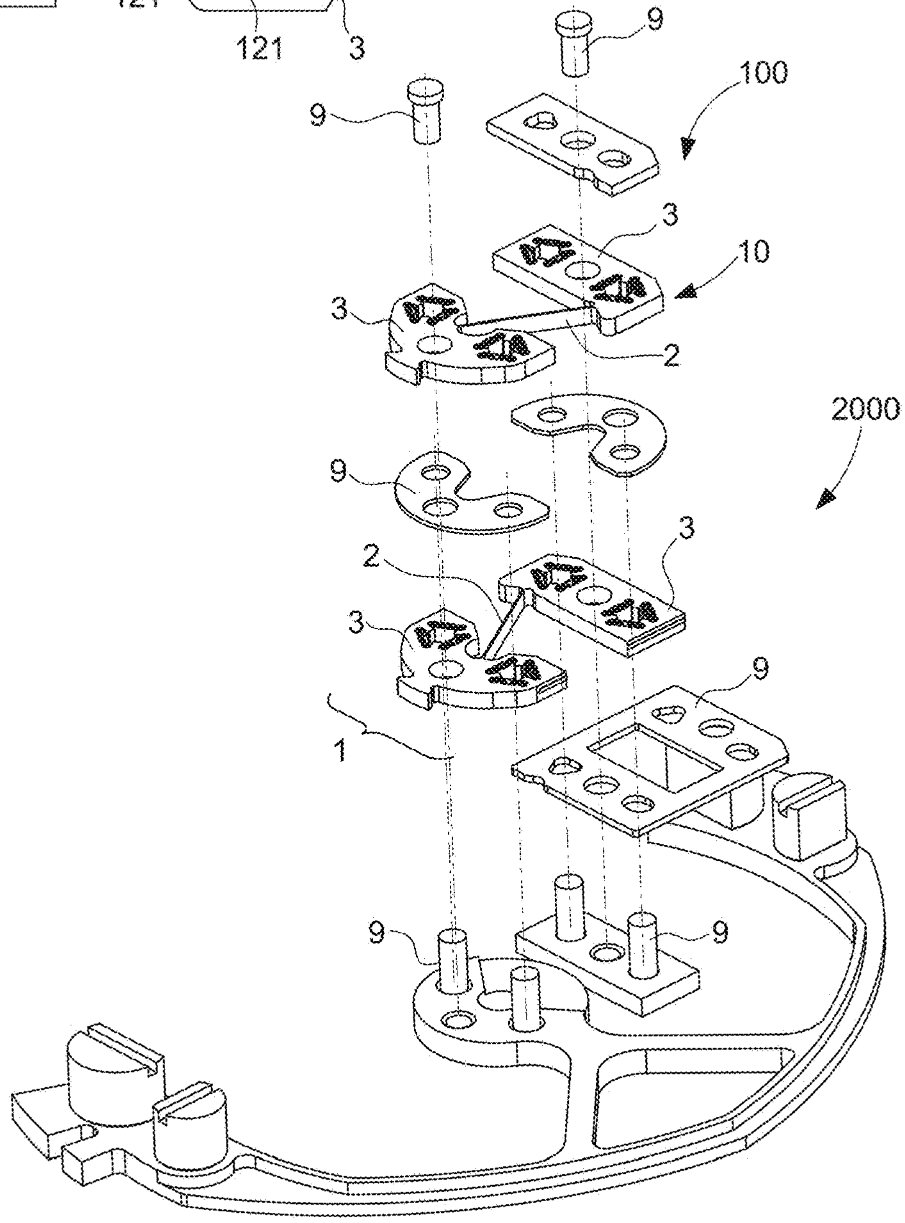
FIG. 2 represents, schematically, and in exploded perspective, a timepiece oscillator structure resulting from stacking various constituents, such divisible units, and various external elements thereof, this structure being at an assembled and connected stage, opening up of the perspective being virtual and only intended to show the unitary constituents, and the sacrificial protection units having already been all removed at the stage of the Figure.
Figure 5:
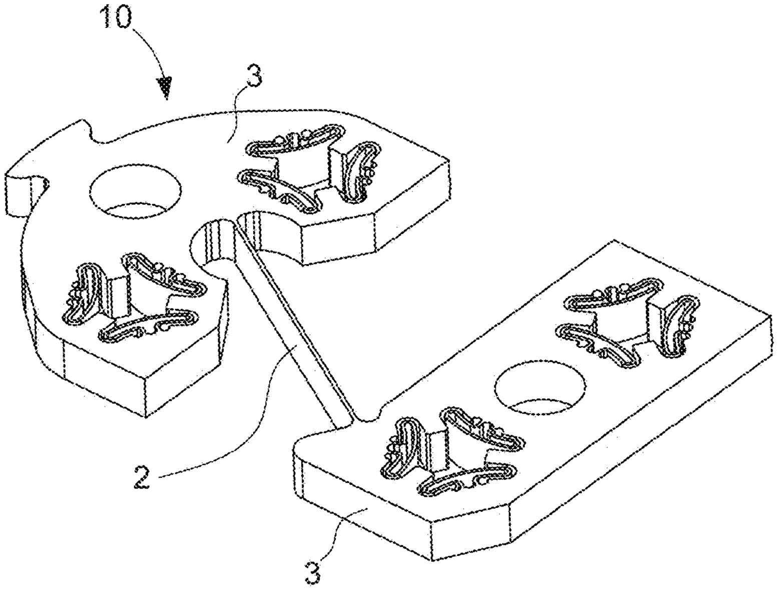
FIG. 5 represents, schematically, and in perspective, the divisible unit of FIG. 1 in a final state after destruction of the divisible zone and elimination of the protection unit.
Figure 6:
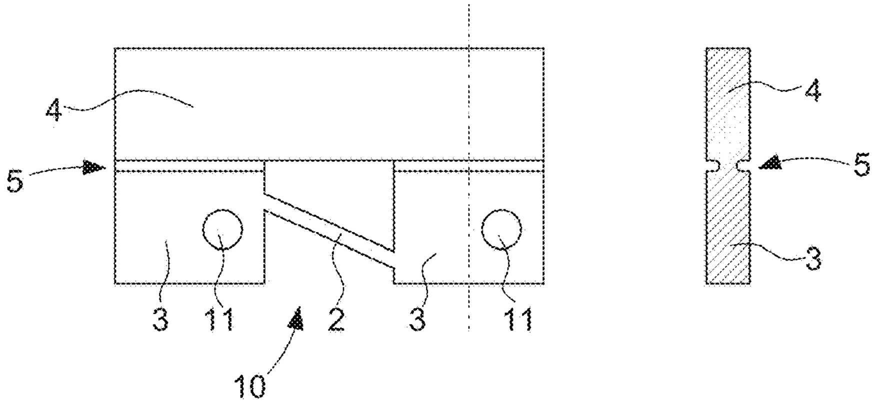
FIGS. 6 to 14 represent, schematically, and in plan view, analogously to FIG. 1, various variants of divisible elements according to the invention, represented in the initial state of FIG. 1.
Figure 7:
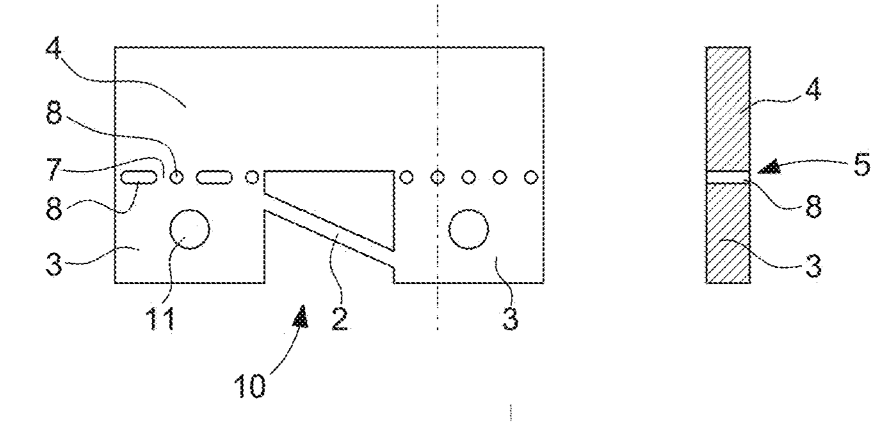

At least one main unit 3 comprises at least one assembly surface 6 or 11 for rigid fixing thereof to the at least one external element 9. The Figures distinguish smooth assembly surfaces 6, such as borings or similar, and traversing housings 11 comprising a relief which is able to ensure clamping: more particularly, and as visible in FIG. 5, a traversing housing 11 comprises, for passage and fixing of a spindle or a pin or a screw or similar, a plurality of elastic centring springs 12 and a plurality of limit stops for a radial course 13. Of course the upper and lower support surfaces of the divisible unit 10 are, especially in the preferred configuration illustrated by the Figures where the divisible unit 10 extends between two upper and lower parallel surfaces, also assembly surfaces with external elements 9. FIG. 2 thus shows a timepiece structure 100, in particular an oscillator structure, comprising a stack of divisible elements 10 and external elements 9, which are maintained relative to each other in the stacking direction, by other external elements 9 which are linkage and/or fixing elements: rods, bolts, screws, rivets, pins, or similar.

More particularly, each main unit 3 comprises at least one such assembling surface 6 or 11 for rigid fixing thereof to at least one external element 9.

More particularly, at least one said main unit 3 forms a free inertial mass and is devoid of any linkage with an external element 9, which can be the case of FIG. 14 if the annular sector is left entirely free, suspended simply by two blades 2 making together a V starting from the main unit 3.

More particularly, the divisible unit 10 comprises a single protection unit 4. This configuration is very reliable if the divisible unit 10 is compact and easily accessible laterally, and it is preferred whenever possible. However, in certain configurations, the divisible unit 10 is very extended in length, or even, once assembled is no longer accessible from everywhere, or even its implantation prevents extraction of a single protection unit 4, in this case it is useful to have a plurality of protection units 4.

In a particularly advantageous application, in the centre of the divisible unit 10, at least one said flexible blade 2 or blade with necks 20 is prestressed in a multistable state, as long as each said protection unit 4 is connected to the component 1. This configuration is interesting in particular when the divisible unit 10 is produced in silicon, and when the prestressing of the flexible element which it comprises is ensured by growth of silicon dioxide, which takes place differentiated on the thin zones and solid zones, and involves buckling of the flexible element: the solid part here is formed by the protection unit 4 in addition to the main units 3.

The advantage is the assembling of such a component without requiring any particular pretensioning, the pretensioning is ensured, preserved integrally, and functioning is perfectly reproducible once the component 1 is enclosed and fixed in the structure 100 of which it is part: destruction of the divisible unit does not strictly change anything in the prestressing of the flexible element.

More particularly, the divisible unit 10 is planar, extends between two parallel upper and lower surfaces, and is made of a micromachinable material, or made of silicon and silicon oxide, or made of DLC, or made of an at least partially amorphous material, or similar.

In a particular embodiment, this divisible unit 10 extends over a single level corresponding to the thickness of the thickest said flexible blade 2 or blade with necks 20 which it comprises.

Figure 11:
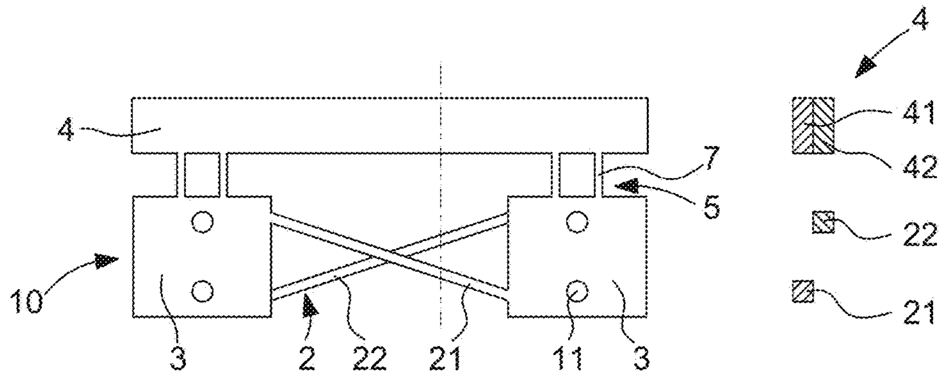
Figure 12:
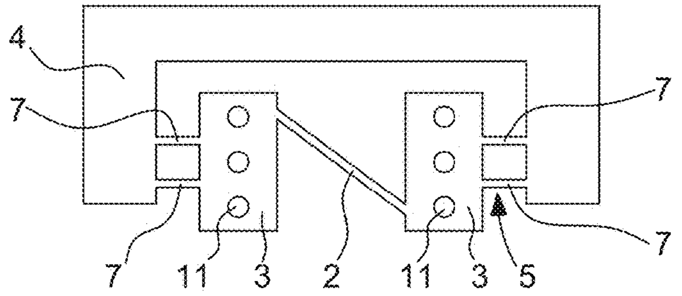
Figure 13:
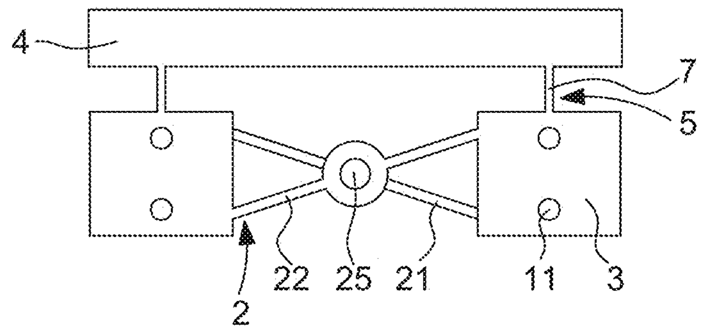

In a particular embodiment, as visible in the example of FIG. 11, the divisible unit 10 extends over a plurality of levels, each corresponding to the thickness of the thickest flexible blade 2 or blade with necks 20 which it comprises. This FIG. 11 thus shows two intersecting blades, each on a particular level, for example each level is produced firstly separately in silicon, and the two levels are assembled by growth of silicon dioxide at the level of their joint surface. Thus this divisible unit 10 comprises, over various levels, flexible blades 2 or blades with necks 20 which intersect, in projection on a plane parallel to the plane of each of the components 1.

In a particular advantageous configuration, the divisible unit 10 is monobloc and non-dismantlable.

The invention also relates to a timepiece oscillator structure 100, comprising a plurality of components 1 fixed one on the other, at least one component 1 of which is a constituent of a divisible unit 10, as described above. More particularly, the structure 100 comprises a plurality of components 1 which are stacked one on the other, at least one component 1 of which is a constituent of such a divisible unit 10.

More particularly, the structure 100 comprises at least two components 1 which are stacked one on the other, each being a constituent of such a divisible unit 10 comprising one said flexible blade 2 or blade with necks 20, and these flexible blades 2 or blades with necks 20 intersect, in projection on a plane parallel to the plane of each of the components 1.

In particular, all the components 1 which said structure 100 comprises form a stack subjected to a clamping force by a linkage clamped along the direction of stacking by connection means which comprise at least one assembled rivet and/or one screw-nut assembly and/or at least one component fixed by clamping.

In one variant, at least some of the components 1 which the structure 100 comprises are maintained in the stack by gluing. More particularly, all the components 1 which the structure 100 comprises form a stack maintained by gluing.

Advantageously, the structure 100 comprises at least one component 1 comprising a traversing housing 11 for passage and fixing of a spindle or a pin or a screw, this traversing housing 11 comprising a plurality of elastic centring springs 12 and a plurality of limit stops for limitation of radial travel 13. In the case of one development of the divisible unit 10 made of silicon, the position of these limit stops 13 is designed in order to allow sufficient straight travel not to break the silicon, this travel is close to 10 micrometers relative to the nominal diameter of the pin or the element of the assembly linkage.

After assembly and connection by screwing and/or fixing and/or gluing or other, each divisible unit 10 is broken at the level of each divisible linkage 5. Hence the protection elements 4 are eliminated from this structure 100.

The invention also relates to a timepiece oscillator mechanism 1000 comprising at least one such structure 100.

The invention also relates to a timepiece movement 2000 comprising at least one such timepiece oscillator mechanism 1000, and/or comprising at least one such structure 100, and/or comprising at least one said divisible unit 10.

The invention also relates to a watch 3000 comprising such a timepiece movement 2000.

The invention also relates to a method for producing a timepiece mechanism comprising at least one component 1, which comprises at least one flexible blade 2 or blade with necks 20 joining two main units 3, each more rigid than this flexible blade 2 or blade with necks 20.

According to this method, there is produced, for at least one component 1, a divisible unit 10 as described above, each divisible unit 10 is assembled with the other constituents of the timepiece mechanism and then all the protection units 14 are separated by breaking of each divisible linkage 5.

More particularly, assembling of the constituents of the timepiece mechanism is effected on a board or tooling equipment, this board or respectively this tooling equipment is fitted with connection means which comprise at least one assembled rivet and/or one screw-nut assembly and/or at least one component fixed by clamping, and/or an adhesive, for assembling with clamping and/or gluing of a stack of constituents along the direction of stacking, and the clamping and/or gluing of the connection means is implemented before implementing breaking of each divisible linkage 5.

What is claimed is:

1. A timepiece oscillator structure comprising:

at least one divisible unit, which comprises at least one component which comprises at least one flexible blade or at least one blade with necks, joining two main units, each more rigid than said flexible blade or blade with necks, wherein said divisible unit comprises at least one protection unit which is designed to be adjacent to a first one of said main units to which said protection unit is connected by at least one divisible linkage which is designed in order to make possible a detachment of said protection unit from said component when said component is fixed, by said first one of said main units which is designed to be adjacent to said protection unit, to an external element more rigid than said flexible blade or than the necks of said blade with necks, the external element being different from said first one of said main units, and the at least one protection unit is adjacent to the main units which are situated on both sides of the at least one flexible blade or blade with necks, in order to protect said at least one flexible blade or blade with necks, wherein said at least one protection unit is adjacent to said first one of said main units until said component is fixed to the external element, and said at least one protection unit is configured to be detached from said first one of said main units after said component is fixed to the external element.

2. The structure according to claim 1, wherein said at least one divisible linkage comprises a zone of a smaller section than that of said first one of said main units and said at least one protection unit which are adjacent thereto, and/or comprises at least one bridge, and/or comprises at least one incipient break produced in a thickness of a material.

3. The structure according to claim 1, wherein each of said two main units is adjacent to said protection unit to which said protection unit is connected by said at least one divisible linkage.

4. The structure according to claim 1, wherein at least one of said main units forms a free inertial mass, and is designed to be fixed to another free inertial mass of another said at least one divisible unit.

5. The structure according to claim 1, wherein at least one of said main units comprises at least one assembly surface for rigid fixing thereof to said external element.

6. The structure according to claim 5, wherein each of said two main units comprises at least one assembly surface for rigid fixing thereof to said external element.

7. The structure according to claim 1, wherein at least one of said main units forms a free inertial mass and is devoid of any direct linkage with said external element.

8. The structure according to claim 1, wherein said divisible unit comprises a single said protection unit.

9. The structure according to claim 1, wherein said flexible blade or blade with necks is prestressed in a multistable state, as long as said divisible linkage is intact, and as long as each said protection unit is connected to said component.

10. The structure according to claim 1, wherein said divisible unit is planar and is made of a micromachinable material, or made of silicon and silicon oxide, or made of DLC, or made of an at least partially amorphous material.

11. The structure according to claim 1, wherein said divisible unit extends over a single level corresponding to a thickness of the thickest said flexible blade or blade with necks which said divisible unit comprises.

12. The structure according to claim 1, wherein said divisible unit extends over a plurality of levels, each corresponding to a thickness of the thickest flexible blade or blade with necks which said divisible unit comprises.

13. The structure according to claim 12, wherein said divisible unit comprises, over various levels, said flexible blades or blades with necks which intersect, in projection on a plane parallel to the plane of each of said components.

14. The structure according to claim 1, wherein said divisible unit is monobloc and said divisible unit is configured to not come apart before breaking.

15. The structure according to claim 1, further comprising a plurality of components fixed one on the other, at least one component of which is a constituent of said divisible unit.

16. The structure according to claim 15, wherein said plurality of components are stacked one on the other.

17. The structure according to claim 15, wherein said structure comprises at least two components which are stacked one on the other, each being a constituent of said divisible unit comprising one said flexible blade or blade with necks, and wherein said flexible blades or blades with necks intersect, in projection on a plane parallel to the plane of each of said components.

18. The structure according to claim 16, wherein all of said components which said structure comprises form a stack subjected to a clamping force by a linkage clamped along a direction of said stack by connection means which comprises at least one assembled rivet and/or one screw-nut assembly and/or at least one component fixed by clamping.

19. The structure according to claim 17, wherein all said components which said structure comprises form a stack where they are joined one to another by adhesive.

20. The structure according to claim 1, wherein said structure comprises at least one said component comprising a traversing housing for passage and fixing of a spindle or a pin or a screw, said traversing housing comprising a plurality of elastic centring springs and a plurality of limit stops for limitation of radial travel.

21. The structure according to claim 1, wherein each said divisible unit is broken at a level of each said divisible linkage.

22. A timepiece oscillator mechanism comprising at least one of said structure according to claim 1.

23. A timepiece movement comprising at least one of said timepiece oscillator mechanism according to claim 22.

24. A watch comprising said timepiece movement according to claim 23.

25. The structure according to claim 1, wherein the external element is not configured to provide oscillation.

* * * * *